United States Patent [19]
Hayashi et al.
[11] 4,159,208
[45] Jun. 26, 1979

[54] PROCESS FOR PRODUCTION OF COLOR DEVELOPER

[75] Inventors: Takao Hayashi; Hajime Kato, both of Fujimiya, Japan

[73] Assignee: Fuji Photo Film Co., Ltd., Minami-ashigara, Japan

[21] Appl. No.: 939,300

[22] Filed: Sep. 5, 1978

Related U.S. Application Data

[63] Continuation of Ser. No. 815,032, Jul. 12, 1977, abandoned, which is a continuation of Ser. No. 562,324, Mar. 26, 1975, abandoned.

[30] Foreign Application Priority Data

Mar. 26, 1974 [JP] Japan .................................. 49-33792

[51] Int. Cl.[2] .......................... C09C 1/00; C09C 3/06; C09C 3/08

[52] U.S. Cl. .......................... 106/308 Q; 106/288 B; 282/27.5; 427/150; 427/151; 428/307; 428/914

[58] Field of Search .................... 106/14.5, 21, 288 B, 106/308 Q, 308 B; 252/62.1, 62.1 L, 62.1 P, 316; 427/150, 151, 146; 428/306, 307, 309, 403, 913, 914; 282/27.5

[56] References Cited

U.S. PATENT DOCUMENTS

| | | | |
|---|---|---|---|
| 3,389,007 | 6/1968 | Oda et al. | 428/307 |
| 3,682,680 | 8/1972 | Hayashi et al. | 428/307 |
| 3,896,255 | 7/1975 | Kato et al. | 428/411 |
| 3,905,936 | 9/1975 | Hawthorne | 106/308 Q |
| 3,924,027 | 12/1975 | Saito et al. | 427/146 |
| 3,980,492 | 9/1976 | Thompson | 106/308 Q |
| 4,030,941 | 6/1977 | Kunkle et al. | 106/308 Q |
| 4,038,101 | 6/1977 | Thompson | 106/308 Q |

*Primary Examiner*—George F. Lesmes
*Assistant Examiner*—R. Eugene Varndell, Jr.
*Attorney, Agent, or Firm*—Sughrue, Rothwell, Mion, Zinn and Macpeak

[57] ABSTRACT

A process for the production of a color developer comprising reacting an alkali metal salt of an aromatic carboxylic acid and a water-soluble metal salt in the presence of clay and a water-insoluble aluminum compound.

14 Claims, No Drawings

PROCESS FOR PRODUCTION OF COLOR DEVELOPER

This application is a continuation application of Ser. No. 815,032, filed July 12, 1977, in turn a continuation application of Ser. No. 562,324, filed Mar. 26, 1975, both now abandoned.

BACKGROUND OF THE INVENTION

1. Field of the Invention

The present invention relates to a process for the production of a color developer. More particularly, the present invention relates to a process for the production of a color developer which reacts with a color former, thereby causing color formation.

2. Description of the Prior Art

A recording sheet is well known which utilizes the color-formation reaction which occurs when a substantially colorless electron donating organic compound such as Malachite Green lactone, Benzoyl Leucomethylene Blue, Crystal Violet lactone, Rhodamine-B-lactam, a 3-dialkylamino-7-dialkylaminofluorane, 3-methyl-2,2-spirobi(benzo[f]chromen), and the like (hereinafter, color former), is contacted with an electron accepting material (hereinafter, color developer).

Representative examples of such recording sheets are a pressure sensitive copying paper as described in, for example, U.S. Pat. Nos. 2,505,470, 2,505,489, 2,550,471, 2,548,366, 2,712,507, 2,730,456, 2,730,457, 3,418,250, etc., and a heat sensitive recording member as described in, for example, Japanese Patent Publication No. 4160/1968 and U.S. Pat. No. 2,939,009, etc., and the like. Furthermore, a printing method is known which comprises transferring an ink containing a color former through a device such as a stencil onto a developer coated sheet (as described in German Patent Application (OLS) No. 1,939,624, etc.).

In many cases, the coloring reaction is caused by the application of a physical action such as pressure, heat, and the like using a pen, a typewriter, or the like.

The most typical example of these recording sheets is a pressure sensitive copying paper. A pressure sensitive copying paper is produced by dissolving a color former in a solvent, dispersing the resulting solution in a binder or encapsulating the resulting solution, and then coating the thus obtained coating solution on a support such as a paper, a synthetic resin film, a synthetic resin coated paper, and the like.

A heat sensitive recording sheet is produced by coating a color former in combination with a heat-meltable material such as acetanilide on a support. In this case, the heat-meltable material is one which melts on heating and dissolves the color former.

On the other hand, a color developer is dissolved or dispersed in water or an organic solvent in combination with a binder, and is coated on or impregnated into the support. The color developer can be coated or impregnated as a composition prior to recording.

In general, the color former and the color developer are coated on the same side of or on both sides of the support, or on different supports.

A solid acid is generally used as the above color developer, and clays such as acid clay, activated clay, attapulgite, zeolite, bentonite, and the like; organic acids such as succinic acid, tannic acid, gallic acid, phenol compounds, and the like; and acid polymers such as phenol resins, e.g., phenol-formaldehyde resins and phenol-acetylene resins, and the like; etc. are known.

Particularly, phenol resins have been attracting public attention as a color developer (as disclosed in Japanese Patent Publication No. 20144/1967), and many improvements therein have been proposed as described in, for example, U.S. Pat. Nos. 3,516,845, 3,540,911, and British Pat. No. 1,065,587.

A phenol resin is excellent in that the color image formed is not affected when contacted with water, but the developing capability of the phenol resin is not sufficient and the light durability of the color image formed is poor. For example, thus color image obtained from a phenol resin and Crystal Violet lactone fades easily when it is allowed to stand under normal room ilumination, not to mention when the image is exposed to sunlight, and the surface of the phenol resin not involved in the formation of the color turns yellow. Furthermore, other acid polymers, for example, a maleic acid-rosin resin, or a partially or completely hydrolyzed styrene-maleic anhydride copolymer are not practical in that their developing capability is inherently low.

Metal compounds of an aromatic carboxylic acid have already been proposed as being effective as a color developer for a recording sheet. Namely, the use of the metal compounds of an aromatic carboxylic acid substantially improves properties of the color developer. However, the developing capability and film strength of the coating layer are insufficient depending upon the preparation of the developer coating solution, and additional improvements have been desired.

SUMMARY OF THE INVENTION

An object of the present invention is to provide a process for the production of a color developer which has improved coating properties.

Another object of the present invention is to provide a process for the production of a color developer which has improved developing capability and film strength.

Thus, the present invention provides a process for producing a color developer comprising reacting an alkali metal salt of an aromatic carboxylic acid and a water-soluble metal salt in the presence of clay and a water-insoluble aluminum compound.

DETAILED DESCRIPTION OF THE INVENTION

As described above, a metal compound of an aromatic carboxylic acid inherently possesses color developing capability, and thus such a compound can be used as a color developer even when it is used individually. However, when a coating solution containing the metal salt is prepared, the viscosity of the coating solution is increased and furthermore metal compounds having a large particle size (100μ or more) are produced, and thus color developing capability and film strength of the finally produced color developer layer becomes insufficient.

The coating solution containing the metal compound of an aromatic carboxylic acid is generally produced by reacting at least one alkali metal salt of an aromatic carboxylic acid and a water-soluble metal salt. At this time, if a clay such as acid clay, activated clay, bentonite, attapulgite, and the like is added to the system and reacted, the size of the particles of the metal compound of the aromatic carboxylic acid is decreased, and thus a coating solution which possesses a high color developing capability and provides a good film quality, can be obtained. However, the viscosity of the coating solution is high and the coating properties are quite poor.

On the contrary, if a water-insoluble aluminum compound is present in combination with a clay when the alkali metal salt of the aromatic carboxylic acid and the water-soluble metal salt are reacted, the color developing capability and film strength are increased as compared to when the clay alone is used, and furthermore the viscosity is low and the coating properties are improved.

The term "water-insoluble aluminum compound" as used herein designates those aluminum compounds which are soluble in water in a proportion of about $10^{-1}$ g or less per 100 g of water (at 20° C.), such as aluminum oxide, aluminum hydroxide, aluminum phosphate, magnesium aluminate, cobalt aluminate, and the like.

On the other hand, the "clay" as used in combination with the water insoluble aluminum compound includes the generally well known clays such as acid clay, activated clay, bentonite, attapulgite, kaolin, agaltomite, diatomaceous earth, and the like, and those clays which have an aromatic compound absorption index of 25 or less, such as acid clay, weakly acid treated acid clay, bentonite, and the like are preferred. Clays having an aromatic compound adsorption index of 25 or less tend to increase the viscosity of the system in producing the metal compound of the aromatic carboxylic acid, but when the water insoluble aluminum compound is also present, the viscosity of the system is markedly decreased. The aromatic compound adsorption index is measured as follows.

Clay is pulverized and passed through a 325 mesh sieve, and the clay so sieved is placed in a weighing bottle and dried in a thermostat at 150°±5° C. for 3 hours. After drying, the clay is placed in a desiccator (desiccating agent: $CaCl_2$) and allowed to stand at room temperature to produce a sample. 1 g of the sample is accurately weighed out and placed in a centrifugal test tube (volume 10 ml). 2 ml of a mixed solvent of anhydrous toluene and anhydrous isooctane (30:70 by volume) is added to the centrifugal test tube and the test tube is stoppered. The test tube is shaken while gently holding down the stopper to disperse the sample well. Then the test tube is firmly capped and mounted on a shaker vibrating at 100 reciprocations per minute and shaken at room temperature (20° C.–30° C.) for 40 minutes. After shaking, the test tube is centifuged at 3500 rpm for 2 minutes to separate a supernatant solution. The refractive index of the original solution and the supernatant are measured at 20° C., and the data obtained are employed in calculating the aromatic compound adsorption index according to the following relationship.

Aromatic Compound Adsorption Index =(Refractive Index of Mixed Solvent of Toluene and Isooctane)−(Refractive Index of Supernatant)

The aromatic carboxylic acids as used herein include those acids represented by the following formula (I):

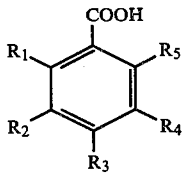

(I)

wherein $R_1$, $R_2$, $R_3$, $R_4$, and $R_5$, which may be the same or different each is a hydrogen atom, a hydroxy group, a halogen atom (e.g., a chlorine atom and a bromine atom), a nitro group, a formyl group, an alkyl group (e.g., having 1 to 20 carbon atoms, preferably 2 to 12 carbon atoms, for example, unsubstituted alkyl groups such as a methyl group, an ethyl group, a propyl group, an n-butyl group, a t-butyl group, an n-amyl group, a t-amyl group, a nonyl group and the like, and substituted alkyl groups substituted with substituents such as a halogen atom, e.g., chlorine or bromine, a —CHO group, an $—NO_2$ group, an —OH group, and the like), a cycloalkyl group (e.g., having 5 to 10 carbon atoms, for example, a cyclohexyl group), an aryl group (e.g., a phenyl group, a naphthyl group which may be unsubstituted or substituted with a halogen atom, e.g., chlorine or bromine, a formyl group, a nitro group or hydroxyl group and the like), an alkaryl group (e.g., containing the above described alkyl and aryl groups as the moieties thereof and in which the alkyl moiety contains 1 to 10 carbon atoms), an aralkyl group (e.g., containing the above described alkyl and aryl groups as the moieties thereof and in which the alkyl moiety contains 1 to 10 carbon atoms), an alkoxy group (e.g., having 1 to 20 carbon atoms, preferably 2 to 12 carbon atoms, for example, a methoxy group, an ethoxy group, a t-butoxy group, a nonyloxy group and the like) or an aryloxy group (e.g., a phenoxy group), and $R_1$, $R_2$, $R_3$, $R_4$, and $R_5$ at adjacent positions may combine to form a ring (e.g., a 5- or 6-membered saturated or unsaturated ring, for example, a benzene ring, a cyclohexyl ring, etc.). Dimers of the acids represented by the formula (I) in which at least one of $R_1$ to $R_5$ is a methylene group or chain bonding two of the benzene rings of the formula (I) together are also suitable.

Of the acids represented by the formula (I), those acids represented by the following formula (II), and dimers thereof, are particularly useful in the present invention.

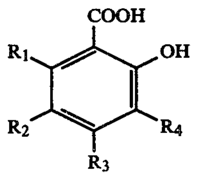

(II)

wherein $R_1$, $R_2$, $R_3$, and $R_4$ are the same as defined above.

Representative examples of the alkali metal salts of aromatic carboxylic acids are sodium salts, potassium salts, lithium salts, cesium salts and the like.

Representative examples of these aromatic carboxylic acids of the formula (I) are benzoic acid, chlorobenzoic acid (o- , m-, and p-isomers), nitrobenzoic acid (o-, m-, and p-isomers), toluic acid (o-, m-, and p-isomers), 4-methyl-3-nitrobenzoic acid, 2-chloro-4-nitrobenzoic acid 2,3-dichlorobenzoic acid, 2,4-dichlorobenzoic acid, p-isopropylbenzoic acid, 2,5-dinitrobenzoic acid, p-tert-butylbenzoic acid, N-phenylanthralinic acid, 4-methyl-3-nitrobenzoic acid, salicylic acid, m-hydroxybenzoic acid, p-hydroxybenzoic acid, 3,5-dinitrosalicyclic acid, 5-tert-butylsalicylic acid, 3-phenylsalicylic acid, 3-methyl-5-tert-butylsalicylic acid, 3,5-di-tert-butylsalicylic acid, 3,5-di-tert-amylsalicylic acid, 3-cyclohexylsalicylic acid, 5-cyclohexylsalicylic acid, 3-methyl-5-isoamylsalicylic acid, 5-isoamylsalicylic acid, 3,5-di-secbutylsalicylic acid, 5-nonylsalicylic acid, 2-hydroxy-3-methylbenzoic acid, 2-hydroxy-5-tert-butylbenzoic acid, 2,4-cresotic acid, 5,5-methylenedisalicylic acid, acetaminosalicylic acid (o-, m-, and p-isomers), 2,4-dihydroxybenzoic acid, 2,5-dihydroxybenzoic acid, anacardic acid, 2-naphthoic acid, 1-hydroxy-2-naphthoic acid, 2-hydroxy-3-naphthoic acid, 2-hydroxy-1-naphthoic acid, thiosalicylic acid, 2-carboxybenzaldehyde, and the like.

On the other hand, the "water-soluble metal salts", e.g, a solubility of 1 g or more in 100 g of water at 25° C., which react with the above described alkali metal salts of aromatic carboxylic acids, include the hydrochlorides, sulfates, nitrates, acetates, and the like of metals of Group I B of the Periodic Table such as copper, silver, and the like; metals of Group II A such as magnesium, calcium, and the like; metals of Group II B such as zinc, cadmium, mercury, and the like; metals of Group III A such as aluminum, gallium, and the like; metals of Group IV A such as tin, lead, and the like; metals of Group VI B such as chromium, molybdenum, and the like; metals of Group VII B such as manganese, and the like; and metals of Group VIII such as cobalt, nickel, and the like. Of these metal salts, particularly effective metal salts are the hydrochlorides, the sulfates, or the nitrates of zinc, tin, aluminum, magnesium, and calcium.

The color developer of the present invention can be easily obtained by stirring a mixture of the alkali metal salt of an aromatic carboxylic acid and the water soluble metal compound in the presence of clay and the water insoluble aluminum compound. Thus, the reaction conditions are not limited to any specific reaction conditions. However, the pH of the system preferably ranges from about 6 to 13, especially preferably from 8 to 11, because the viscosity is further decreased. It is sufficient in this invention for the clay and water insoluble aluminum compound to be present simply in combination, and thus the order of addition is not limited. And any order of addition can be used.

The alkali metal salt of the aromatic carboxylic acid and the water soluble metal salt are generally reacted in an equimolar amounts at a temperature of from about 0 to about 100° C., preferably from 10 to 50° C., for a period of from 1 second to one hour, but one of them can be present in excess. The amount of the clay employed is about 0.1 to 1000 parts by weight, preferably about 2 to 50 parts by weight, per 100 parts by weight of the alkali metal salt of the aromatic carboxylic acid, and the amount of the water-insoluble aluminum compound employed is about 0.5 parts by weight or more, e.g., about 0.5 to 200 parts by weight, particularly about 1 to 100 parts by weight, per 100 parts by weight of the alkali metal salt of the aromatic carboxylic acid.

In this way, a coating solution of a color developer can be obtained, and to the coating solution can be added, if desired, a water-soluble or water-dispersible binder. Suitable examples of these binders include natural polymer compounds such as proteins, e.g., gelatin, gum arabic, albumin, casein, etc., celluloses, e.g., carboxymethyl cellulose, hydroxyethyl cellulose, etc., saccharides, e.g., agar, sodium alginate, starch, carboxymethyl starch, etc., and the like; and synthetic polymer compounds such as polyvinyl alcohol, polyvinyl pyrrolidone, polymers of maleic acid, e.g., a styrene-maleic acid polymer, a methylvinyl ethermaleic acid polymer, a rosin-modified maleic acid polymer, acrylic acid polymers, e.g., polyacrylic acid, an acrylic acid-acrylamide polymer, and the like, etc. In addition, examples of water-dispersible binders include latexes and emulsions with water as a dispersing agent. For example, a latex, e.g,, a styrene-butadiene based latex, a butadiene-acrylonitrile based latex, a chloroprene based latex, a vinyl acetate based latex, an acryl based latex, a vinyl chloride based later, etc., produced by emulsion polymerization, and a polybutadiene emulsion, a polyisoprene emulsion, a butyl rubber emulsion, etc., produced by dispersing a polymer produced by an ion polymerization in solution, e.g., in water using a solvent and an emulsifier, can be used. The binder is generally employed in an amount of about 5 to 50 parts by weight per 100 parts by weight of the coating solution (solid content). To the coating solution, an acid resin such as a phenol-formaldehyde resin, e.g., in a proportion of from about 10 to about 1000 parts by weight per 100 parts of the metal salt, an inorganic pigment such as a metal oxide, a metal hydroxide, or the chemically or physically treated derivative thereof, e.g., in a proportion of about 10 to about 1000 parts by weight per 100 parts by weight of the metal salt, can be added.

The coating solution is coated, either over the entire surface or on selected portion on the surface of a support such as a synthetic resin film, a synthetic resin coated paper, synthetic paper, and the like so that the amount of the metal compound of the aromatic carboxylic acid is about 0.1 $g/m^2$ or more, preferably about 0.5 to 2 $g/m^2$ of the support. The upper limit of the coating amount is determined mainly from a economic standpoint and thus the effect of the present invention is still achieved above the range described above.

The color developer of the present invention possesses the property of causing a color to be formed when it is brought into contact with an electron donating colorless compound and thus can be utilized for various recording sheets. The present invention will be explained by reference to the most typical recording sheet, i.e., a pressure sensitive copying paper.

Micro-capsules used in a pressure sensitive copying paper can be easily produced using well known methods. Since the concentration of the color former can be easily determined on dissolving the color former when producing the micro-capsules, the production of the micro-capsules used in the present invention is not limited at all. Microencapsulation methods which can be used in this invention include a coacervation method (as described in U.S. Pat. Nos. 2,800,457, 2,800,458, 3,041,289, 3,687,865, etc.), an interfacial polymerization method (as described in U.S. Pat. Nos. 3,492,380, 3,577,515, British Pat. Nos. 950,443, 1,046,409, 1,091,141, etc.), an internal polymerization method (as described in British Pat. No. 1,237,498, French Pat. Nos. 2,060,818, 2,090,862, etc.), an external polymerization method (as described in British Pat. No. 989,264, Japanese Patent Publication Nos. 12380/1962, 14327/1962, 29483/1970, 7313/1971, 30282/1971, etc.), and the like.

Solvents for use in dissolving the color former are not limited at all in the present invention and a wide variety can be used. Any hitherto known solvents can be used, and for example, aromatic synthetic oils such as alkylated naphthalenes, alkylated biphenyls, hydrogenated terphenyls, alkylated diphenylmethanes (in each case, the number of carbon atoms of the alkyl group is about 1 to 5 and the number of alkyl groups is about 1 to 4), and the like, petroleum fractions such as kerosene, naphtha, paraffin oil, and the like, aliphatic synthetic oils such as chlorinated paraffin, and the like, vegetable oils such as cotton seed oil, soybean oil, linseed oil, and the like, and mixtures thereof can be used. The concentration of the color former solution is not particularly limited, and thus it is easy for one skilled in the art to produce micro-capsules using concentrations (about 1 to 10%) of the color former solution generally used in producing conventional pressure sensitive copying papers.

The color former as used herein is a colorless compound which is colored when brought in contact with a color developer, such as a solid acid, and can be also defined as an electron donating colorless organic compound the color former. The color developer of the present invention is not materially limited by the kind, property, and the like of the color former. Thus all kinds of color formers can be used. For example, triacrylmethane compounds, diarylmethane compounds, xanthene compounds, thiazine compounds, spiropyran compounds, and the like can be used.

Representative examples of these color formers are shown below:

Typical examples of triphenylmethane compounds are 3,3-bis-(p-dimethylaminophenyl)-6-dimethylaminophthalide, i.e., Crystal Violet lactone, 3,3-bis(p-dimethylaminophenyl)phthalide, 3-(p-dimethylaminophenyl)-3-(1,2-di-methylindole-3-yl)phthalide, 3-(p-dimethylaminophenyl)-3-(2-methylindole-3-yl)phthalide, 3-(p-dimethylaminophenyl)-3-(2-phenylindole-3-yl)phthalide, 3,3-bis-(1,2-dimethylindole-3-yl)-5-dimethylaminophthalide, 3,3-bis-(1,2-dimethylindole-3-yl)-dimethylaminophthalide, 3,3-bis-(9-ethylcarbazole-3-yl)-5-dimethylaminophthalide, 3,3-bis-(2-phenylindole-3-yl)-5-dimethylaminophthalide, 3-p-dimethylaminophenyl-3-(1-methylpyrrole-2-yl)-6-dimethylaminophthalide, and the like.

Examples of diphenylmethane compounds are 4,4-bis-dimethylaminobenzyhydrin benzyl ether, N-halophenyl Leucoauramine, N-2,4,5-trichlorophenyl Leucoauramine, and the like.

Suitable examples of xanthene compounds are Rhodamine-B-anilinolactam, Rhodamine-(p-nitroanilino)lactam, Rhodamine-B-(p-chloroanilino)lactam, 7-dimethylamino-2-methoxyfluoran, 7-diethylamino-2-methoxyfluoran, 7-diethylamino-3-chloro-2-methylfluoran, 7-diethylamino-3-(acetylmethylamino)fluoran, 7-diethylamino-3-(dibenzylamino)-fluoran, 7-diethylamino-3-(methylbenzylamino)-fluoran, 7-diethylamino-3-(chloroethylmethylamino)fluoran, 7-diethylamino-3-(diethylamino)fluoran, and the like.

Representative examples of thiazine compounds are benzoyl Leucomethylene Blue, p-nitrobenzyl Leucomethylene Blue, and the like.

Examples of spiro based compounds are 3-methyl-spirodinaphthopyran, 3-ethyl-spiro-dinaphthopyran, 3,3'-dichloro-spirodinaphthopyran, 3-benzyl-spirodinaphthopyran, 3-methyl-naphtho-(3-methoxy-banzo)-spiropyran, 3-propyl-spiro-dibenzodipyran, and the like.

The above described color formers can be used individually or as mixtures comprising two or more thereof.

Thus, a micro-capsule coating solution can be obtained. The micro-capsules are preferably mono-nuclear, but the object of the present invention can also be attained using multi-nuclear micro-capsules. The size of the micro-capsules generally is on the order of about 1 to 500μ, preferably about 2 to 50μ. In the present invention, micro-capsules of the same size can be used.

The micro-capsule coating solution can be coated on a support as it is because the solution is generally a capsule dispersion in a solution. Furthermore, with or without the separation of the micro-capsules from the micro-capsule dispersion in the solution, a binder, for example, a latex, e.g., a styrene-butadiene-rubber latex, etc., a water-soluble polymer compound, e.g., starch, carboxymethyl cellulose, polyvinyl alcohol, gum arabic, casein, gelatin, etc., and the like can be added to the coating composition and coated. Furthermore, to the capsule coating solution or a capsule layer, a capsule reinforcing agent, for example, a cellulose fine powder (as described in U.S. Pat. No. 2,711,375), a polymer fine powder (as described in U.S. Pat. No. 3,625,736), a starch fine powder (as described in British Pat. No. 1,232,347), micro-capsules not containing a color former (as described in British Pat. No. 1,235,991), and the like can be added. The capsule reinforcing agent preferably is not present in a layer form, but rather is dispersed in the capsule layer or on the surface thereof. A suitable coating amount of the microcapsules is about 1 to 10 g (as color former) per $m^2$ of the support.

The above described supports include a synthetic resin film, synthetic resin coated paper, synthetic paper, and the like. The micro-capsule layer is coated on at least one side of the support, or on or under the color developer layer as described hereinafter, or on the surface of the support opposite to the color developer layer.

Conditions such as the kind, amount, addition method, and form of the additives to be added to the color developer layer, or the kind, form, and the like of the color former to be colored in combination with the color developer, or the kind of the solvent, or the like can be according to conventional recording sheet techniques.

In accordance with the method of the present invention, a color developer coating solution comprising uniform and fine particles can be produced in the presence of the clay and the water-insoluble aluminum compound, and thus a sufficiently high developing capability can be obtained with a thin coating layer. Thus, when the color former is contacted with the color developer, the color developer can provide a color image of a high density immediately. Furthermore, since the particles of the color developer are small and uniform (about 0.5 to 20μ), the surface of the coating layer has excellent smoothness and has a strong film strength, and thus a color developer having excellent printing properties can be obtained.

Furthermore, in the course of producing the color developer, the viscosity of the coating solution is not increased and thus it is possible to improve the coating properties. Hence, coating of the color developer simultaneously with paper-manufacturing becomes advantageous and furthermore air knife coating becomes easy. These advantages as well as the thin coating layer contribute to a reduction in the cost of the product.

The present invention will be explained in greater detail by reference to the following example. In each example, the effect of the present invention was demonstrated by examining an upper layer produced by preparing color former containing micro-capsules in the following manner and coating the resulting micro-capsules on a support, and an under paper was produced by coating the color developer of the present invention on a support.

The color former containing micro-capsules can be produced by various known methods, but in this case, they were produced by the method as described in U.S. Pat. No. 2,800,457 as follows. Unless otherwise indicated, all parts, percents, ratios and the like are by weight.

In 400 parts of water at 40° C. were dissolved 10 parts of acid treated pig skin gelatin and 10 parts of gun arabic. To the resulting solution, 0.2 parts of Turkey red oil as an emulsifier was added, and 40 parts of a color former oil was emulsified and dispersed therein. The color former oil was prepared by dissolving 3% of Crystal Violet lactone in diisopropyl naphthalene. When the size of the oil droplets became 5 microns on the average, the emulsification was stopped. Water at 40° C. was added to make the volume of the system 900 parts and the stirring was continued. At this time, care was taken to keep the solution temperature at 40° C. or higher. Then a 10% acetic acid aqueous solution was added to adjust the pH of the solution to 4.0 to 4.2 to cause coacervation. The stirring was further continued, and after 20 minutes, the solution was cooled with ice water to gell the coacervate film deposited around the oil droplet. When the solution temperature was 20° C., 7 parts of a 37% formaldehyde aqueous solution was added. When the temperature was 10° C., 40 parts of a sodium a 7% sodium carboxymethyl cellulose solution was added and then a 15% sodium hydroxide agueous solution was added to adjust the pH to 9. Subsequently, the solution was heated for 20 minutes while continuing the stirring to increase the solution temperature to 50° C. The thus obtained micro-capsule dispersion was adjusted to 30° C., and then the solution was coated on a paper of 40 g/m$^2$ and dried to provide a coating amount (solid content) of 5 g/m$^2$. Thus a capsule sheet was obtained.

EXAMPLE 1

To 19.8 parts of water were added 5 parts of acid clay (aromatic compound adsorption index 14) and 1 part of the aluminum compounds as indicated in Table 1, and the mixture dispersed. Then, a 10% aqueous solution of sodium hydroxide was added with stirring to adjust the pH of the system to 10.5. 6 parts of a 10% gelatin aqueous solution was added, and a solution prepared by dissolving 0.56 parts of zinc chloride in 8 parts of water at 80° C. was gradually added. Then 2 parts of 3,5-di-tert-butylsalicylic acid was dissolved in 0.32 parts of sodium hydroxide and 20 parts of water, and the resulting solution was gradually added to the above system for reaction. To the thus obtained dispersion was added 6 parts of a styrene-butadiene copolymer latex (solid content 48%, hereinafter SBR latex) to prepare a coating solution. This coating solution was coated using a coating rod on an original paper of 50 g/m$^2$ to provide a solid content of 4 g/m$^2$.

EXAMPLE 2

To 16.4 parts of water were added 5 parts of the same acid clay as used in Example 1 and 0.25 parts of aluminum oxide and the mixture dispersed. An 18% aqueous solution of sodium hydroxide was added with stirring to adjust the pH of the system to 10.5, then 6 parts of a 10% gelatin aqueous solution was added, and a solution prepared by dissolving 0.56 parts of zinc chloride in 8 parts of water at 80° C. was gradually added. Then 2 parts of 3,5-di-tert-butylsalicylic acid was dissolved in an aqueous solution comprising 0.32 parts of sodium hydroxide and 20 parts of water at 80° C., and the resulting solution was gradually added for reaction. To the thus obtained dispersion was added 6 parts of SBR latex to prepare a coating solution. This coating solution was coated using a coating rod on an original paper of 50 g/m$^2$ to provide a solid content of 4 g/m$^2$.

COMPARISON EXAMPLE 1

The procedures of Example 1 were repeated except that the water was used in an amount of 15.3 parts and the aluminum compounds were not employed and thus a developer sheet for comparison was obtained.

EXAMPLE 3

The procedures of Example 1 were repeated except that activated clay (aromatic compound adsorption index: 20) was used in place of the acid clay of Example 1 to obtain a developer sheet.

COMPARISON EXAMPLE 2

The procedures of Example 1 were repeated except that the water was used in an amount of 15.3 parts, the same activated clay as described in Example 2 was used in place of the acid clay of Example 1, and the aluminum compounds were not used, to obtain a developer sheet for comparison.

EXAMPLE 4

The procedures of Example 1 were repeated except that bentonite was used in place of the acid clay of Example 1 to obtain a developer sheet.

COMPARISON EXAMPLE 3

The procedures of Example 1 were repeated except that the water was used in an amount of 15.3 parts, bentonite was used in place of the acid clay of Example 1, and the aluminum compounds were not used, to obtain a developer for comparison.

EXAMPLE 5

To 23.6 parts of water were added 5 parts of the same acid clay as used in Example 1 and 1 part of aluminum hydroxide and the mixture despersed. An 18% aqueous solution of sodium hydroxide was added with stirring to adjust the pH of the system to 10.5. 6 parts of a 10% gelatin aqueous solution was added, and a solution prepared by dissolving 1.4 parts of aluminum sulfate in 8 parts of water was gradually added while further continuing the stirring. Then 2 parts of 3,5-di-tert-butylsalicylic acid was dissolved in an aqueous solution comprising 0.32 parts of sodium hydroxide and 20 parts of water by heating, and the resulting solution was gradually added for reaction. To the thus obtained dispersion solution was added 6 parts of SBR latex to prepare a coating solution. This coating solution was coated on an original paper of 50 g/m$^2$ with a coating rod to provide a solid content of 4 g/m$^2$.

COMPARISON EXAMPLE 4

The procedures of Example 5 were repeated except that the water was used in an amount of 19.1 parts and the aluminum hydroxide was not used, to obtain a developer sheet for comparison.

EXAMPLE 6

The procedures of Example 5 were repeated except that the water was used in an amount of 22.1 parts, 3,5-di-tert-butyl-salicylic acid was used in an amount of 1.67 parts, and aluminum oxide was used in place of the aluminum hydroxide, to obtain a developer.

COMPARISON EXAMPLE 5

The procedures of Example 6 were repeated except that the water was used in an amount of 17.6 parts, and aluminum oxide was not used, to obtain a developer sheet.

COMPARISON EXAMPLE 6

In 8 parts of water was dissolved 0.56 parts of zinc chloride by heating. 2 parts of 3,5-di-tert-butylsalicylic acid was dissolved in an aqueous solution comprising 0.32 parts of sodium hydroxide and 20 parts of water by heating, and the resulting solution was gradually added to the above zinc chloride aqueous solution with stirring. To the thus obtained dispersion solution was added 2.2 parts of SBR latex to prepare a coating solution. This coating solution was coated on an original paper of 50 g/m$^2$ with a coating rod to provide a solid content of 1.5 g/m$^2$.

COMPARISON EXAMPLE 7

To 19.8 parts of water was added 6 parts of aluminum oxide. An 18% aqueous solution of sodium hydroxide was added with stirring to adjust the pH of the system to 10.5, and then 6 parts of a 10% gelatin aqueous solution was added. Then a solution prepared by dissolving 0.56 parts of zinc chloride in 8 parts of water by heating, was gradually added.

A solution prepared by dissolving 2 parts of 3,5-di-tert-butylsalicylic acid in an aqueous solution comprising 0.32 parts of sodium hydroxide and 20 parts of water by heating, was gradually added for reaction. To the thus produced dispersion was added 6 parts of SBR latex to prepare a coating solution. This coating solution was coated on an original paper of 50 g/m$^2$ with a coating rod to provide a solid content of 4 g/m$^2$.

On each of the developer sheets as obtained in Examples 1 to 4 and Comparison Examples 1 to 3 was placed a micro-capsule sheet, and color formation was caused by pressing the sheets under a load of 600 Kg/cm$^2$.

After allowing the sheets to stand in a dark place for 24 hours, the reflection spectrum in the wavelength range of 380 to 700 mμ was measured using a Beckman DB spectrophotometer and the absorbance at maximum absorption is indicated in Table 1 as color density.

Likewise, the viscosity of the coating solutions prepared in Examples 1 to 4 and Comparison Examples 1 to 3 was measured and the results are shown in Table 1. The measurement was conducted using a BL viscometer (60 rpm).

Table 1

| Example or Comparison Example No. | Aromatic Carboxylic Acid | Water Soluble Metal Salt | Aluminum Compound | Clay | Viscosity of Coating Solution (cp) | Color Density of Crystal Violet Lactone |
|---|---|---|---|---|---|---|
| Example 1 | 3,5-Di-tert-butyl-salicylic acid | Zinc chloride | Aluminum Oxide | Acid clay | 5 | 0.95 |
| " | " | Aluminum | " hydroxide | 21 | 1.05 | |
| " | " | " | Aluminum phosphate | " | 8 | 0.99 |
| Example 2 | " | " | Aluminum oxide | " | 5.2 | 0.96 |
| Comparison Example 1 | " | " | — | " | 121 | 0.91 |
| Example 3 | " | " | Aluminum oxide | Activated clay | 4.8 | 0.90 |
| " | " | " | Aluminum hydroxide | " | 15.0 | 0.95 |
| " | " | " | Aluminum phosphate | " | 7.0 | 0.92 |
| Comparison Example 2 | " | " | — | " | 50.0 | 0.86 |
| Example 4 | 3,5-Li-tert-butyl salicylic acid | Zinc chloride | Aluminum. oxide | Bent.-nite | 13.1 | 1.12 |
| " | " | " | Aluminum phosphate | " | 15 | 1.04 |
| Comparison Example 3 | " | " | — | " | 125 | 0.88 |
| Example 5 | " | Aluminum sulfate | Aluminum hydroxide | Acid clay | 23 | 0.90 |
| Comparison Example 4 | " | " | — | " | 130 | 0.85 |
| Example 6 | 3-Phenyl Salicylic | " | Aluminum oxide | " | 6 | 0.84 |

Table 1-continued

| Example or Comparison Example No. | Aromatic Carboxylic Acid | Water Soluble Metal Salt | Aluminum Compound | Clay | Viscosity of Coating Solution | Color Density of Crystal Violet Lactone |
|---|---|---|---|---|---|---|
| | acid | | | | | |
| Comparison Example 5 | " | " | — | " | 127 | 0.81 |
| Comparison Example 6 | 3,5-Di-tert-butyl-salicylic acid | Zinc chloride | — | — | Coagulated | 0.60 |
| Comparison Example 7 | " | " | Aluminum oxide | — | 7.5 | 0.49 |

As can be seen from the results in Table 1, the objects of the present invention can be attained by reacting the aromatic carboxylic acid alkali metal salt and the metal compound in the presence of the clay and the water-insoluble aluminum compound.

Namely, solutions produced without using the clay and the water-insoluble aluminum compound coagulate and cannot be used as a coating solution. Even though such can be coated, the resulting developer sheet possesses a markedly low developing capability and cannot be put into commercial practice. Furthermore, coagulates are present on the surface, the appearance is bad, and the printing properties are poor.

Where the water-insoluble compound is not present, the developing capability is relatively high, but the viscosity is of the order of about 120 cp., and thus the coating property is markedly low. For example, when such a highly viscous coating solution is coated by air knife coating, the air knife air pressure is so high that the coating cannot be controlled.

Where the water-insoluble aluminum compound is present alone, the viscosity is low, but the developing capability is low and thus cannot be put in to practical use.

COMPARISON EXAMPLE 8

In Example 1, when acid clay and aluminum oxide were added to the reaction mixture just prior to the addition of the SBR latex, the solution coagulated and thus coating was very difficult.

COMPARISON EXAMPLE 9

In Comparison Example 7, when acid clay was added just prior to the addition of the SBR latex, the viscosity was relatively low, i.e., 43 cp, but the color density was 0.60, that is, the color density was too low for practical use.

COMPARISON EXAMPLE 10

In Comparison Example 1, when aluminum oxide was added just prior to the addition of the SBR latex, the viscosity was 115 cp and the color density was 0.90, and thus it could be used if there were a suitable coating method.

While the invention has been described in detail and with reference to specific embodiments thereof, it will be apparent to one skilled in the art that various changes and modifications can be made therein without departing from the spirit and scope thereof.

What is claimed is:

1. A process for producing a developer which causes a color to be formed when brought into contact with an electron donating colorless compound comprising mixing (a) a clay selected from the group consisting of acid clay, activated clay, bentonite, attapulgite, kaolin, agaltomite and diatomaceous earth, and (b) a water-insoluble aluminum compound having a solubility of about $10^{-1}$ g or less in 100 g of water at 20° C. to form a dispersion thereof and then at a temperature of from about 0 to about 100° C. mixing one of (c) an alkali metal salt of an aromatic carboxylic acid, and (d) a water-soluble metal salt selected from the group consisting of a water-soluble hydrochloride, sulfate, nitrate or acetate of a metal or group IB, IIA, IIB, IIIA, IVA, VIB, VIIB, and VIII of the Perodic Table with said dispersion and then mixing the other of (c) and (d) with said dispersion.

2. The process according to claim 1, wherein the water-insoluble aluminum compound is selected from the group consisting of aluminum oxide, aluminum hydroxide, aluminum phosphate, magnesium aluminate, and cobalt aluminate.

3. The process according to claim 1, wherein the clay has an aromatic compound adsorption index of 25 or less.

4. The process according to claim 1, wherein the water-soluble metal salt is a hydrochloride, a sulfate, a nitrate or acetate of zinc, tin, aluminum, magnesium, or calcium.

5. The process according to claim 1, wherein the reacting is at a pH of from about 6 to 13.

6. The process according to claim 1, wherein the water insoluble aluminum compound is present in an amount of about 0.5 parts by weight or more per 100 parts by weight of the alkali metal salt of the aromatic carboxylic acid.

7. The process of claim 1 wherein said temperature is from 10° to 50° C.

8. The process of claim 1 wherein said (c) and (d) are reacted for a period of time of from one second to one hour.

9. The process of claim 1, wherein said alkali metal salt of an aromatic carboxylic acid and said water-soluble metal salt are reacted in equimolar amounts.

10. The process of claim 1, wherein said water-soluble metal salt has a solubility of 1 g or more in 100 g of water at 25° C.

11. The process of claim 1, wherein said aromatic carboxylic acid is selected from the group consisting of benzoic acid, chlorobenzoic acid, toluic acid, 4-methyl- 3-nitrobenzoic acid, 2-chloro-4-nitrobenzoic acid, 2,3-dichlorobenzoic acid, 2,4,-dichlorobenzoic acid, p-isopropylbenzoic acid, 2,5-dinitrobenzoic acid, p-tert-butylbenzoic acid, N-phenylanthralinic acid, 4-methyl-3-nitrobenzoic acid, salicylic acid, m-hydroxybenzoic acid, p-hydroxybenzoic acid, 3,5-dinitrosalicylic acid, 5-tert-butyl-salicylic acid, 3-phenylsalicylic acid, 3-methyl-5-tert-butyl-salicylic acid, 3-cyclohexylsalicylic acid, 5-cyclohexyl-salicylic acid, 3-methyl-5-isoamyl-salicylic acid, 5-isoamylsalicylic acid, 3,5-di-sec-butyl-salicylic acid, 5-nonyl-salicylic acid, 2-hydroxy- 3-methylbenzoic acid, 2-hydroxy-5-tert-butylbenzoic acid, 2,4-cresotic acid, 5,5-methylenedisalicylic acid, acetamino-salicylic acid, 2,4-dihydroxybenzoic acid, 2,5-dihydroxybenzoic acid, anacardic acid, 2-naphthoic acid, 1-hydroxy-2-napththoic acid, 2-hydroxy-3-napththoic acid, 2-hydroxy-1-napthoic acid, thiosalicylic acid, 2-carboxybenzaldehyde, nitrobenzoic acid and 3,5-di-tert-amylsalicyclic acid.

12. The process according to claim 1, wherein the aromatic carboxylic acid is an acid represented by the formula (I):

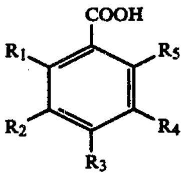

(I)

wherein $R_1$, $R_2$, $R_3$, $R_4$, and $R_5$ which may be the same or different, are selected from the group consisting of a hydrogen atom, a hydroxy group, a halogen atom, a nitro group, an aldehyde group, an alkyl group, a cycloalkyl group, an aryl group, an alkaryl group, an aralkyl group, an alkoxy group or an aryloxy group, and $R_1$, $R_2$, $R_3$, $R_4$, and $R_5$ at adjacent positions may combine to form a ring, and the dimers of the formula (I), wherein at least one of $R_1$, $R_2$, $R_3$, $R_4$ and $R_5$ can be a methylene group or chain.

13. The process according to claim 12, wherein the aromatic carboxylic acid is an acid represented by the formula (II):

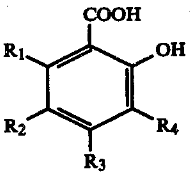

(II)

wherein $R_1$, $R_2$, $R_3$, $R_4$, and $R_5$ are the same as defined in claim 6.

14. A developer produced by the process of claim 1.

* * * * *